United States Patent [19]

Usui

[11] Patent Number: 4,530,025

[45] Date of Patent: Jul. 16, 1985

[54] CURRENT RATIO-DIFFERENTIAL RELAY

[75] Inventor: Masaji Usui, Hyogo, Japan

[73] Assignee: Mitsubishi Denki Kabushiki Kaisha, Tokyo, Japan

[21] Appl. No.: 553,319

[22] Filed: Nov. 18, 1983

[30] Foreign Application Priority Data

Nov. 19, 1982 [JP] Japan .............................. 57-204270

[51] Int. Cl.³ .......................... H02H 3/28; H02H 7/28
[52] U.S. Cl. .......................................... 361/87; 361/36
[58] Field of Search ....................... 361/87, 36, 35, 86, 361/78, 84, 85

[56] References Cited

U.S. PATENT DOCUMENTS 3,754,163  8/1973  Sykes .................................... 361/36
3,984,734 10/1976  Becker ............................. 361/87 X
4,204,237 11/1978  Zocholl ........................... 361/87 X
4,402,028  8/1983  Udren .............................. 361/87 X

FOREIGN PATENT DOCUMENTS 12571  5/1975  Japan .

OTHER PUBLICATIONS

BBC Publication CH–ES 36–10 E, "Electronic Busbar Protection (based on directional comparison)", p. 4, 1975.

Primary Examiner—Patrick R. Salce
Attorney, Agent, or Firm—Bernard, Rothwell & Brown

[57] ABSTRACT

A current ratio-differential relay for protecting a power system comprises a logical circuit which provides the final output upon determination that the operating force signal is active and the suppressing force signal is inactive. The operating force signal is made active when the scalar quantity of the vector summation of line currents flowing into and out of the bus-bar is larger than a certain value, and the suppressing force signal is made active when the maximum value of scalar quantities of the line currents is larger than the scalar quantity of the vectorially-summed current multiplied by a certain constant. Both signals are supplied to the logical circuit through circuit means having a certain time delay in the restoring operation.

5 Claims, 10 Drawing Figures

CURRENT RATIO-DIFFERENTIAL RELAY

BACKGROUND OF THE INVENTION

The present invention relates to a current ratio-differential relay which responds to the ratio of an operating force in proportion to a differential current as a result of vector summation of currents of all lines connected to the bus of a power system, to a suppressing force based on the maximum current of the lines, and more particularly, to a relay means which is devised for the saturation of current transformers.

In FIG. 1, choosing the polarity of currents $I_{F1}$–$I_{Fn}$ flowing from lines $L_1$–$L_n$ into the bus to be positive, it is known that an internal fault shown in FIG. 1(a) causes the total current $$\sum_{i=1}^{n} I_{Fi}$$

to be unequal to zero, while an external fault shown in FIG. 1(b) causes the total current to equal zero. Based on this nature, the conventional current ratio-differential relay has been designed to discriminate an internal fault and external fault from the magnitude of the total current $I_F$. Such an arrangement of the relay is disclosed in Japanese Patent Publication No. 12571/75. A catalog of BROWN BOVERI, entitled Electronic Busbar Protection (based on directional comparison), No. CH-ES36-10E, discloses the technology for compensating the effect of the saturation of current transformers through the extension of the signal duration for the input larger than the setup value. An input of only 1 ms due to the saturation of the current transformer is extended to form a pulse of 4 ms for use in directional comparison. This technology, however, is for the directional comparison only, and does not provide the ratio-differential function.

At the occurrence of an external fault, the currents concentrate into outflow lines, leaving the inflow currents depending on the number of power terminals and the power capacity, causing the large outflow currents to saturate the current transformers, and this results in a significant error in the differential current and eventually in a down-grade accuracy of the relay.

There has been proposed the arrangement of the current ratio-differential relay of this type coping with the saturation of current transformers, as shown in FIG. 2. For explanatory purposes, the following discussion views a power system of a bus-bar and only two lines, but the principle is applicable to systems with more lines merely by increasing the number of differential circuits 7 and inputs of the maximum value sampling circuit 8, as will be described in the following, corresponding to the number of lines.

The arrangement of FIG. 2 includes input terminals 1 and 2 of the relay for receiving the secondary currents $I_1$ and $I_2$ of current transformers CT1 and CT2, the first and second input transformers (TRFs) 3 and 4 for transforming the input signals at the input terminals 1 and 2 into values suitable for the relay, and the first and second rectifying circuits (RECTs) 5 and 6 for making full-wave rectification for AC signals. The rectified output signals are conducted to a maximum value detecting circuit (MAX) 8, which holds the maximum value of the input signal under a certain operating time constant and provides the output $E_T$. The outputs of the input transformers 3 and 4 are also received by a differential circuit (DIF) 7 which evaluates the vector summation of currents in all lines (differential current $I_D$) mentioned previously. The arrangement further includes the third rectifying circuit (RECT) 9 which makes full-wave rectification for the differential current and provides the output signal for a pair of first and second smoothing circuits (SMTs) 10 and 11. The second smoothing circuit 11 operates to smooth the input signal and multiplies it by $\eta_p$ to provide $\eta_p E_p$. A subtraction circuit (SUB) 12 calculates $E_T - \eta_p E_p$ and provides the output only when the resultant value is positive. A circuit 13 is the third smoothing circuit (SMT) with characteristics of fast charging and slow discharging, and provides the output signal $E_R$ together with the output signal Eo of the first smoothing circuit 10 to a comparison circuit (CMP) 14, which provides an active output if $Eo - \eta_R E_R > K$, where Eo represents the operating force, $E_R$ is the suppressing force, $\eta_R$ is the suppressing ratio, and K is the setting value of the relay.

The operation of the relay will be described with reference to FIG. 3 on the assumption that the system is in internal fault with an outflow current from the bus-bar. The current transformer CT1 provides the secondary current $I_1$ of the inflow current, while the CT2 provides the secondary current $I_2$ of the outflow current (since the current flowing into the bus-bar is signed positive, the $I_2$ has the opposite phase relationship with $I_1$ and the magnitude is half that of $I_1$). The differential circuit 7 produces the differential current $I_D$ which is proportional to the vector summation of currents $I_1 + I_2$. After the differential current $I_D$ has been rectified by the rectifying circuit 9, it is smoothed by the smoothing circuit 10 to obtain the differential output, that is, the operating force Eo. The output signals of the input transformers 3 and 4 are rectified by the first and second rectifying circuits 5 and 6, respectively, and their outputs are supplied to the sampling circuit 8, which in turn provides $E_T$ based on $I_1$ (larger than $I_2$). The output of the rectifying circuit 9 is smoothed by the smoothing circuit 11 and, at the same time, multiplied by $\eta_p$ to become $\eta_p E_p$. Here $\eta_p$ is an invariable coefficient determined from the characteristics of the relay. In this embodiment, $\eta_p$ is set to 2 for a reduced suppression force so that a sufficient operating force is obtained even in the presence of the outflow current half that in magnitude of the inflow current at the occurrence of internal faults. Accordingly, the subtraction circuit 12 provides $E_T - \eta_p E_p \leq 0$, causing the smoothing circuit 13 to provide no suppression force $E_R$, and the comparison circuit 14 provides an active output, i.e., the relay responds to the fault. Namely, the suppression force is reduced so as to make the relay more sensitive for operation against internal faults.

FIG. 4 shows the waveform of output signals caused by the external fault in which a faulty current flows from the line on the terminal 1 through the bus-bar to the line on the terminal 2. The differential current $I_D$ is $I_1 + I_2 = 0$, and the operating force Eo is not active. The value of $E_T$ reflecting the maximum value of the line currents becomes directly the suppression force $E_R = E_T - \eta_p E_p$. Accordingly, the comparison circuit 14 receives no operating force Eo, but instead, a large suppressing force $E_R$, providing no active output, and thus the relay does not respond to the fault.

In the conventional bus protection relay, as described above, the output signals Eo and $E_R$ are processed in analog values before they are entered to the final comparison circuit 14 as shown in FIG. 2, and the formula of criterion is expressed as follows.

$$Eo - \eta_R[E_T - \eta_p E_p] > K \qquad (1)$$

In formula (1), $E_R$ is equal to $E_T - \eta_p E_p$, and the comparison circuit 14 is effective only when this value is positive. FIG. 5 shows the case where the input signals $I_1$ and $I_2$ include respectively a DC component, and there are two cases: the input signal $I_2$ having the same level as of $I_1$, and the $I_2$ having a distorted chopped waveform. In the latter case, the differential current appears as shown by $I_D$ in FIG. 5. This causes the smoothing circuit 10 to produce the differential output Eo. However, the output $E_T$ from the circuit 8 is based on $I_1$, the $E_T$ rises faster than the differential output Eo, i.e., $\eta_p E_p$, resulting in a sharp rise of the suppression force $E_R$, whereby the output Eo can be suppressed.

In case $\eta_p E_p$ exceeds the output $E_T$ of the circuit 8 momentarily, the suppressing force $E_R$ does not fall instantaneously since the smoothing circuit 13 is connected at the following stage, and the output $E_R$ of the smoothing circuit 13 takes only positive value. However, if the output signal $\eta_p E_p$ of the smoothing circuit 11 increases or extends in time due to the saturation, the analog processing may not be able to respond, resulting possibly in a failure of operation.

The conventional current ratio-differential relay arranged as described above is apt to malfunction due to the saturation of current transformers, and moreover, it needs complicated adjustments for setting the analog waveforms.

SUMMARY OF THE INVENTION

It is an object of the present invention to provide a current ratio-differential relay which facilitates the process and adjustment for the input/output waveforms and performs satisfactorily even under the saturation of current transformers.

For the total vectorially-summed current Eo flowing into and out of the bus-bar of the power system, the maximum value $E_T$ of the individual line currents, and the $\eta_p$-times summed current $\eta_p E_p$, the current ratio-differential relay according to the present invention sets up the logical condition of being active when $Eo > Ko$ (Ko is a positive constant) and $E_T \leq \eta_p E_p$, while being inactive when $E_T > \eta_p E_p$.

DESCRIPTION OF THE PREFERRED EMBODIMENT

Figure 1A:
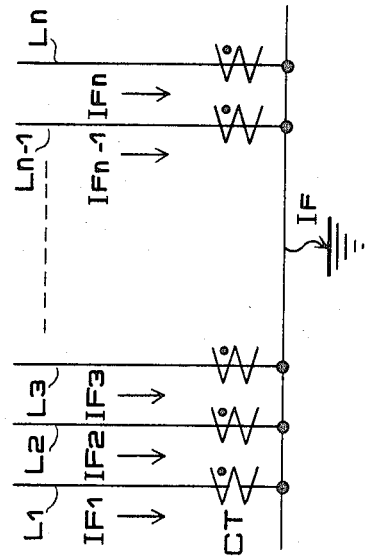
FIG. 1 is a diagram showing the power system.
Figure 1B:
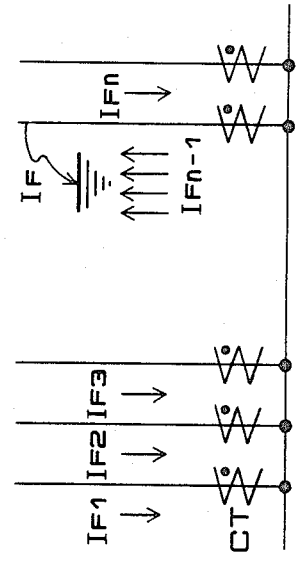
Figure 3:
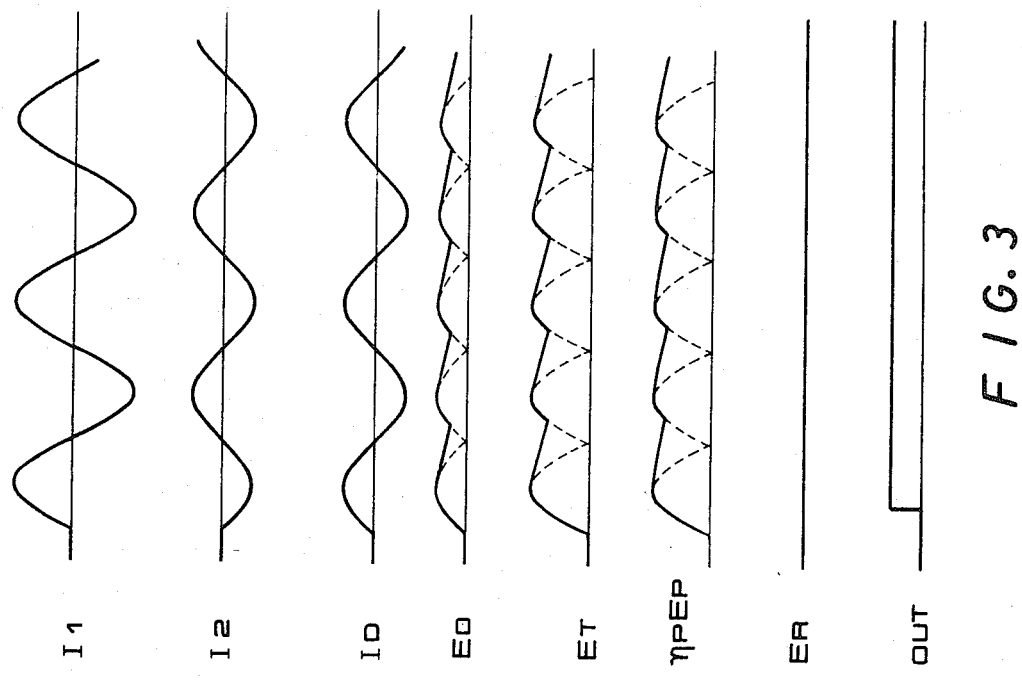
FIG. 3 is a set of waveform diagrams observed in the conventional relay at the occurrence of an internal fault of the power system.
Figure 2:
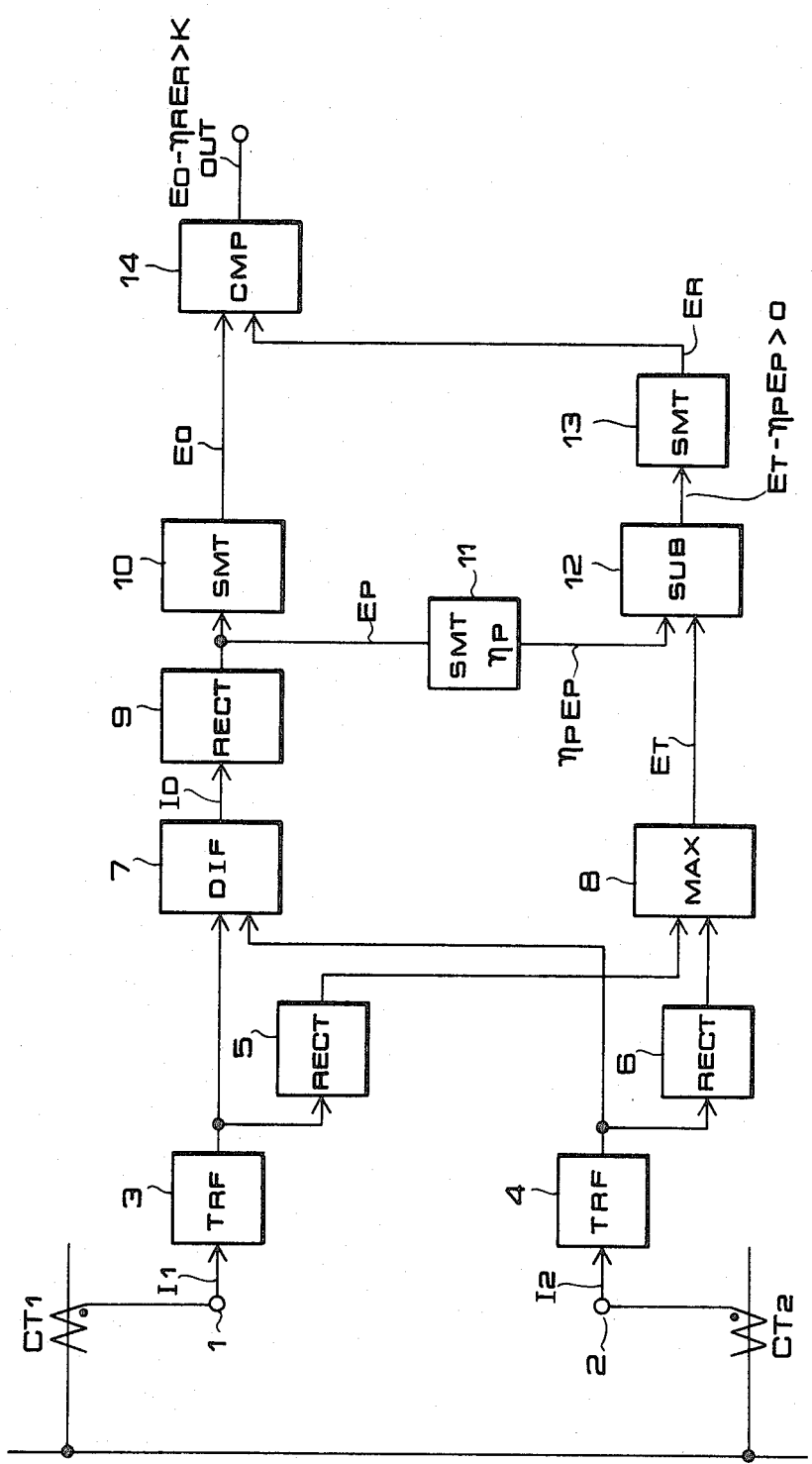
FIG. 2 is a block diagram of the conventional current ratio-differential relay.
Figure 4:
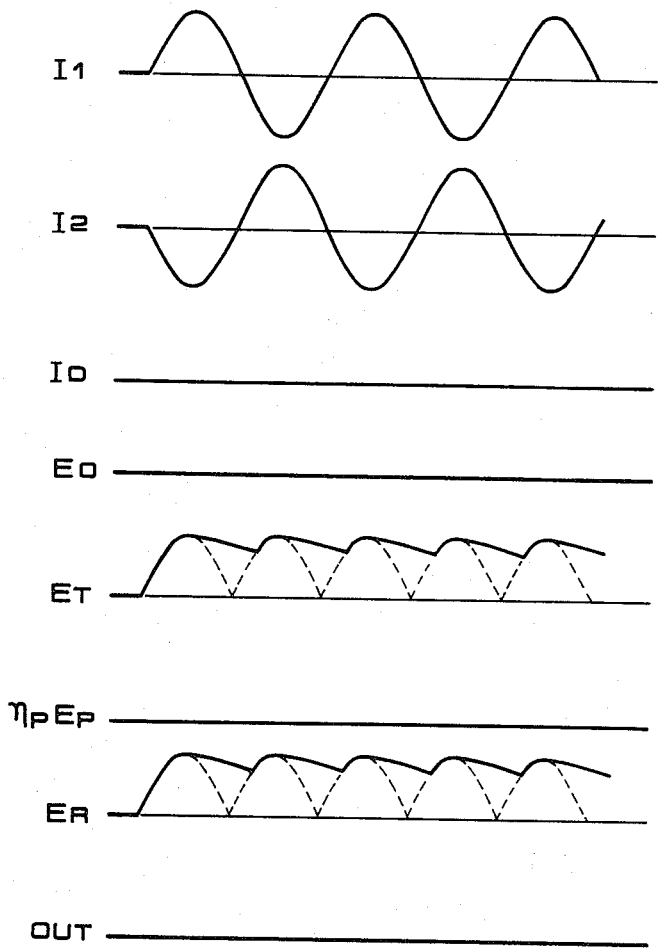
FIG. 4 is a set of waveform diagrams observed at various portions of the conventional relay at the occurrence of an external fault of the power system.
Figure 5:
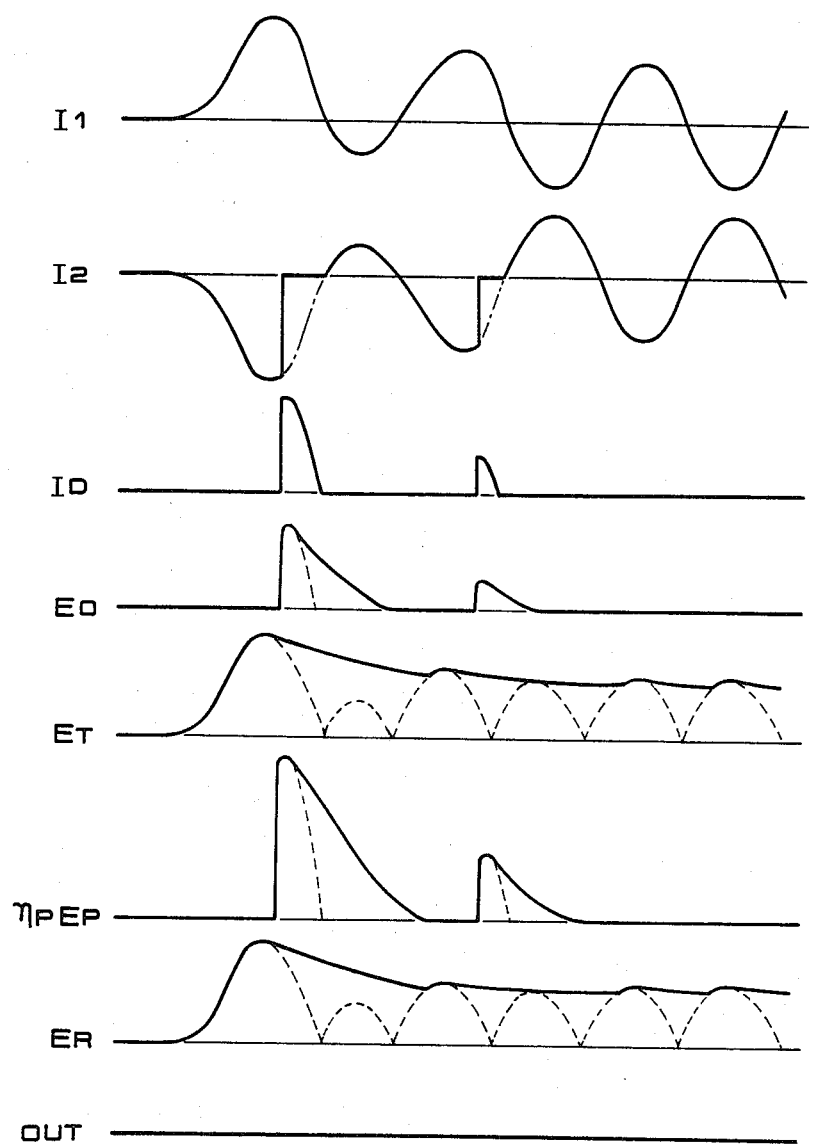
FIG. 5 is a set of waveform diagrams observed at various portions of the conventional relay at the occurrence of the current transformer saturation.
Figure 6:
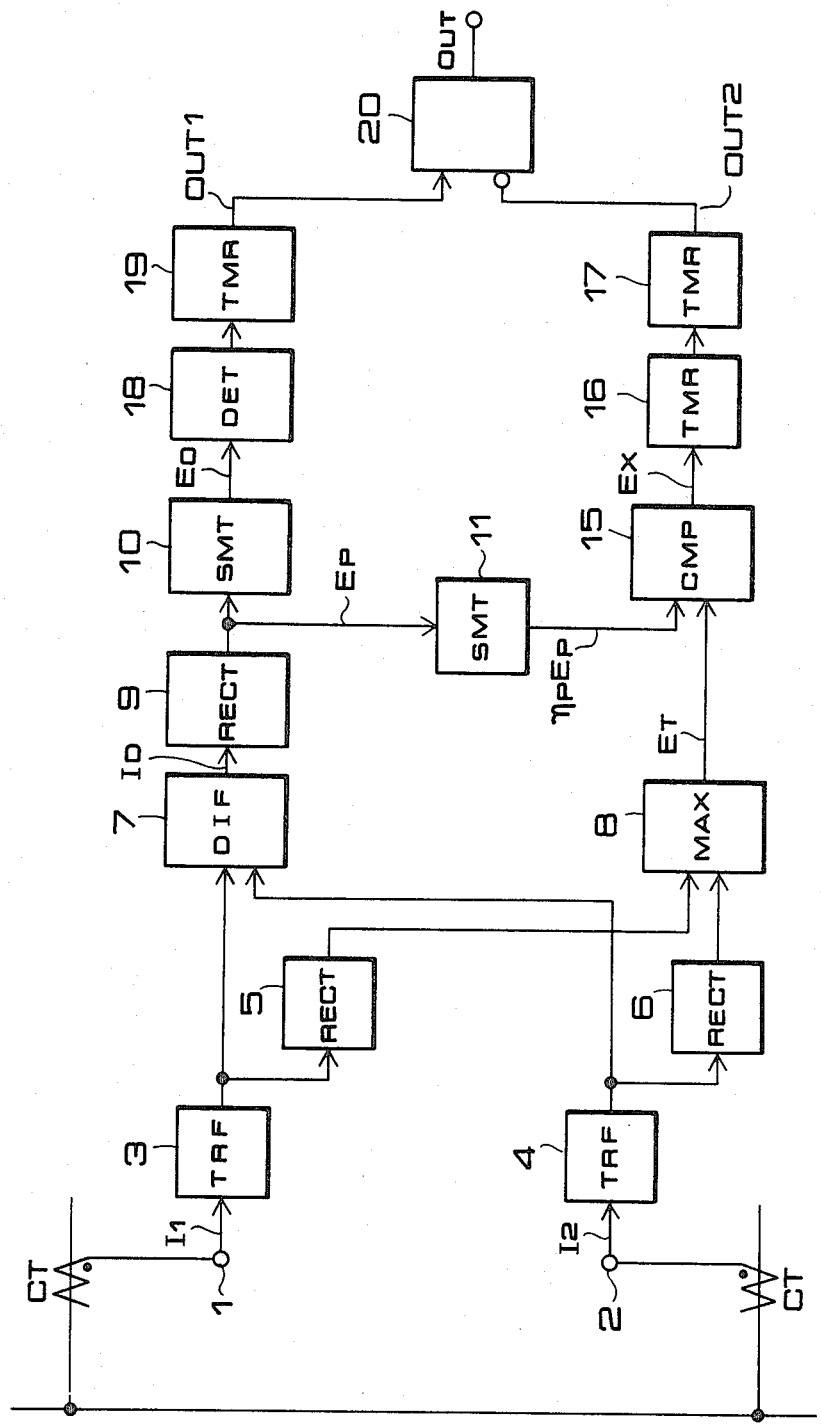
FIG. 6 is a block diagram showing the current ratio-differential relay embodying the present invention.

One embodiment of the present invention will now be described with reference to the drawings. In FIG. 6, portions common to those of FIG. 2 are referred to by the same reference numbers. The arrangement of FIG. 6 includes a comparison circuit 15 which compares the output signal $E_T$ from the detecting circuit 8 with the output signal $\eta_p E_p$ from the smoothing circuit 11 and provides the output signal if $E_T$ is larger than $\eta_p E_p$, a timer, e.g., monostable circuit, 16 which provides the output when the active output signal Ex of the comparison circuit 15 lasts at least a certain time duration, a restorative timer, e.g., monostable circuit, 17 which extends the output signal from the timer 16 for a duration of one cycle or more, a level detection circuit 18 which determines whether or not the differential output Eo of the first smoothing circuit 10 is above the constant value Ko, a restorative timer 19 which extends the duration of the output signal from the level detection circuit 18, and a conditional inhibit circuit, e.g., AND gate, 20 which provides the output when it receives the output signal from the timer 19 but does not receive the output signal from the timer 17.

Figure 7:
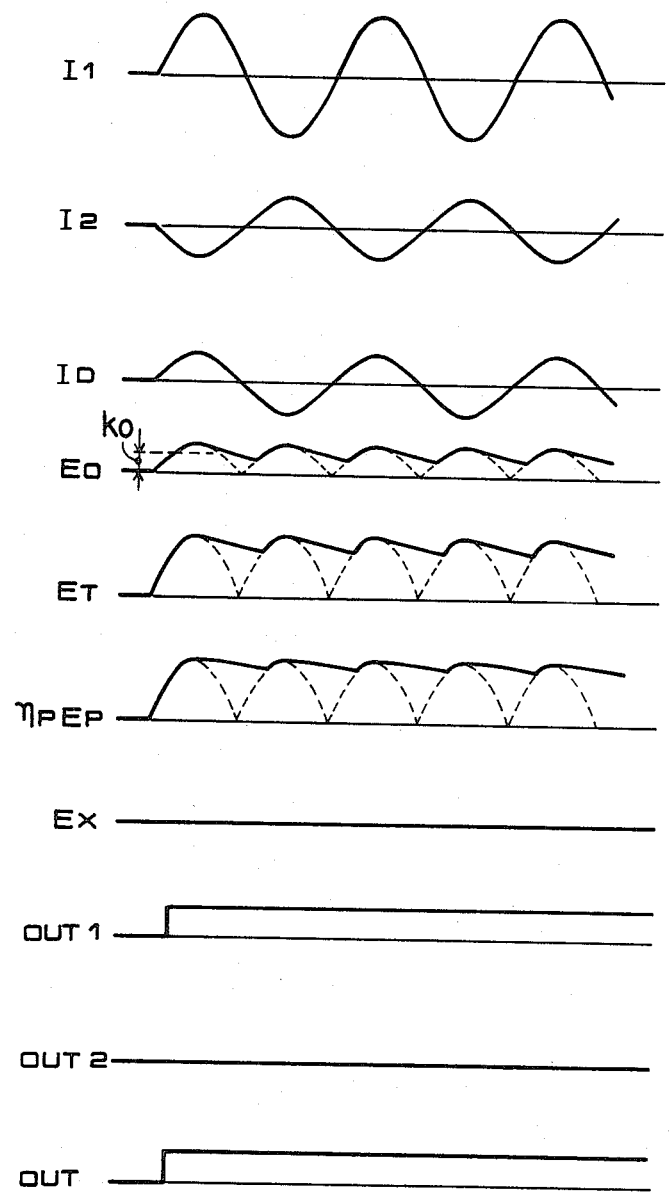
FIG. 7 is a set of waveform diagrams observed at various portions of the inventive relay at the occurrence of an internal fault.
Figure 8:
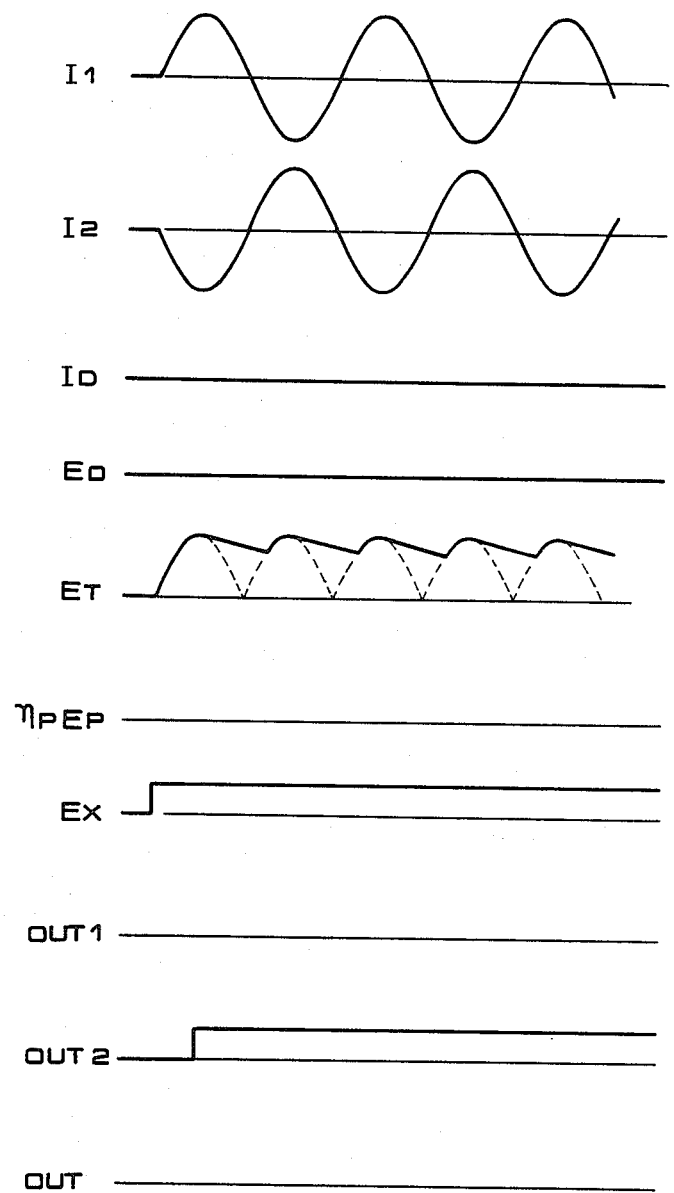
FIG. 8 is a set of waveform diagrams observed at various portions of the inventive relay at the occurrence of an external fault.

The operation of the foregoing circuit arrangement is as follows. FIG. 7 shows the waveforms of various portions of the circuit when the power system suffers the internal fault with an outflow current from the bus-bar. The differential current $I_D$ in proportion to the summed current $I_1 + I_2$ is fed through the rectifying circuit 9 to the smoothing circuit 10, which then provides the differential output, i.e., the operating force signal Eo. The signal Eo has a level above the constant value Ko, and it is detected by the detection circuit 18, causing the timer 19 to provide a high output (OUT1 = "H"). On the other hand, the output signal $E_T$ from the circuit 8 based on $I_1$ (larger than $I_2$) is smaller than the output signal $\eta_p E_p$ ($\eta_p E_p = 2Eo$) from the smoothing circuit 11, and thus the comparison circuit 15 does not provide an active output, causing the timer 17 to inactive (OUT2 = "L"). Receiving a high OUT1 and low OUT2 at its inputs, the circuit 20 provides a high output (OUT = "H") to indicate an occurrence of the internal fault. As illustrated in FIG. 6 the AND gate 20 receives OUT 1 at one input terminal and receives an inverted version of OUT 2 at the other input terminal.

Next, the case of the external fault with a fault current passing through the bus-bar will be described with reference to FIG. 2. The differential current $I_D$ is $I_1 + I_2 = 0$ and the differential output based on the $I_D$ becomes Eo = 0, indicating that the signal Eo is less than the specified level Ko. On this account, the detection circuit 18 does not respond and the OUT1 from the timer 19 is kept low. On the other hand, the output signal $E_T$ from the circuit 8 is larger than the output signal $\eta_p E_p$ (equal to zero) from the smoothing circuit 11, causing the comparison circuit 15 to provide via timer 16 a high output signal to the timer 17, which finally provides the high OUT2. Accordingly, the inhibit circuit 20 provides the low OUT, and this means that the circuit does not respond to external faults.

Figure 9:
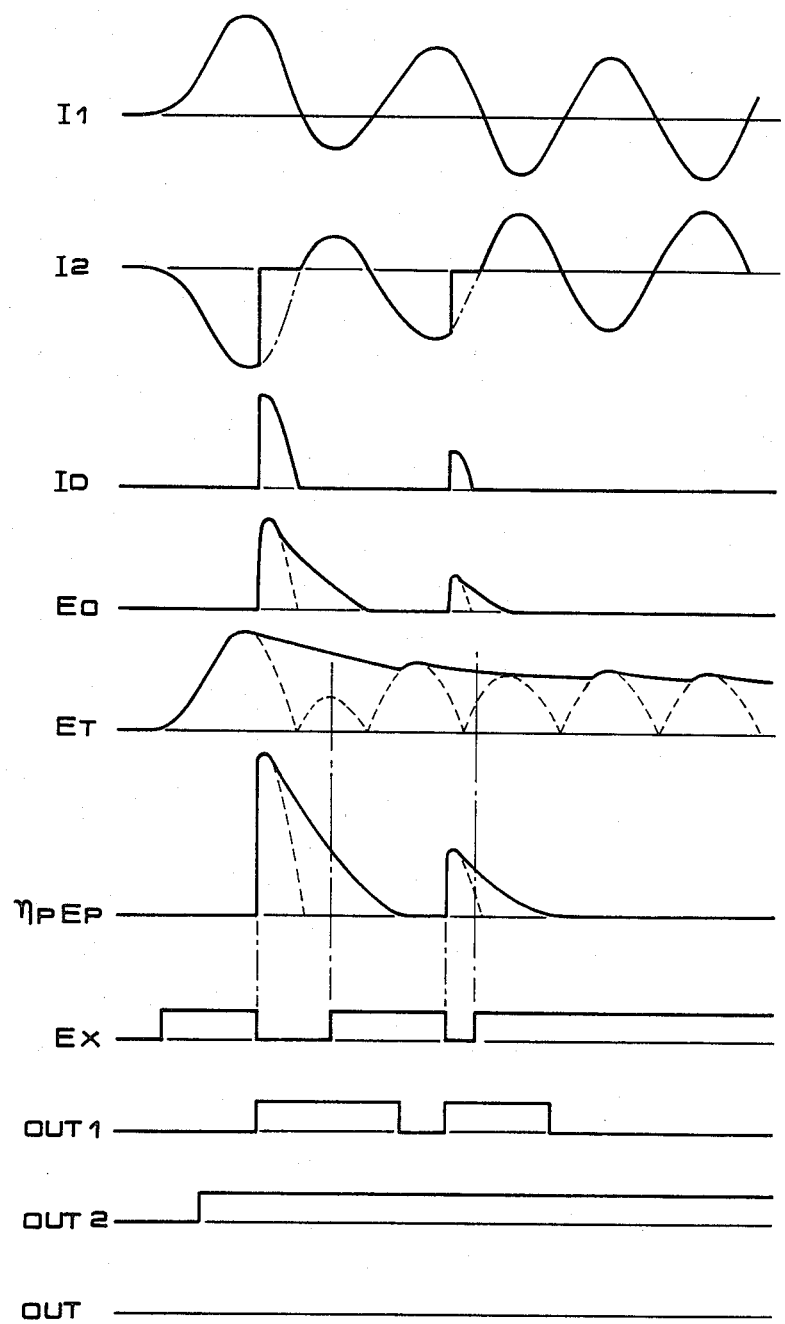
FIG. 9 is a set of waveform diagrams observed at various portions of the inventive relay at the occurrence of the current transformer saturation.

In FIG. 9, if the current $I_2$ has a distorted chopped waveform due to the saturation of the current transformer CT2, the differential current $I_D$ appears during the period of saturation. This causes the differential output to exceed the level Ko, resulting in a momentary generation of the operating force Eo, and in response to it the detector 18 operates on the timer 19 to allow to output an intermittent high OUT1 signal. It will be appreciated that this signal can be a continuous signal if the timer 19 is provided with a sufficiently long restoration time.

Since the output signal $E_T$ from the circuit 8 based on $I_1$ is generated first, that is followed by the generation of the output signal $\eta_p E_p$ (equal to 2Eo) from the smoothing circuit 11, the output signal Ex from the comparison circuit 15 goes low only during a period in which $\eta_p E_p$ exceeds $E_T$, while maintaining high in the remaining period. Nevertheless, due to a delay of the restoring timer 17, the output signal OUT2 has a high level continuously, and then the circuit 20 provides the low output. This means that the circuit does not malfunction even under the saturation of the current transformer CT2. In consequence, when the $\eta_p E_p$ appears increasingly or in extended duration due to the saturation of the current transformer, the suppression force signal OUT2 is surely made active, and the relay does not malfunction even if the operating force signal OUT1 is produced by virtue of the saturation.

Although, in the foregoing embodiment, the arrangement with two input terminals has been described, the same effect is of course achieved for arrangements with more input terminals.

What is claimed is:

1. A current ratio-differential relay for protecting a power system comprising:
    a detection means which detects that a vectorial summation of currents flowing into or out of a bus-bar of said power system exceeds a predetermined value;
    a restraint generating means which generates the maximum instant value of an analog value from said currents flowing into or out of said bus-bar;
    a comparison means which provides an active resultant output if the value of said summed current multiplied by a predetermined constant is smaller than a maximum value provided by said restraint generating means;
    a timer means which retains the output of said comparison means for a predetermined duration after said resultant output has faded; and
    a logical circuit which receives the output of said detection means at its first input and the output of said timer means at its second input, and provides a protective operation signal when a predetermined logical condition is met.

2. A current ratio-differential relay according to claim 1, wherein said currents are derived from currents of lines connected to said bus-bar and detected through current transformers.

3. A current ratio-differential relay according to claim 2, wherein said current transformers produce positive currents for line currents flowing into said bus-bar.

4. A current ratio-differential relay according to claim 1, wherein said restraint generating means comprises rectifiers which rectify currents flowing into or out of said bus-bar.

5. A current ratio-differential relay according to claim 1, wherein said logical circuit comprises a gate circuit for taking logical product for a signal at said first input and an inverted version of a signal at said second input.

* * * * *